US 12,045,876 B2

United States Patent
Zhu et al.

(10) Patent No.: US 12,045,876 B2
(45) Date of Patent: Jul. 23, 2024

(54) SYSTEMS AND METHODS FOR EXCHANGING USER DATA

(71) Applicant: Capital One Services, LLC, McLean, VA (US)

(72) Inventors: Xiaoguang Zhu, New York, NY (US); Lin Ni Lisa Cheng, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 53 days.

(21) Appl. No.: 17/573,269

(22) Filed: Jan. 11, 2022

(65) Prior Publication Data
US 2023/0222575 A1    Jul. 13, 2023

(51) Int. Cl.
*G06Q 40/03* (2023.01)
*G06N 20/00* (2019.01)
*G06Q 20/20* (2012.01)

(52) U.S. Cl.
CPC .............. *G06Q 40/03* (2023.01); *G06N 20/00* (2019.01); *G06Q 20/202* (2013.01)

(58) Field of Classification Search
CPC ........ G06Q 40/03; G06Q 20/202; G06N 20/00
See application file for complete search history.

(56) References Cited

U.S. PATENT DOCUMENTS

| 8,489,499 | B2 | 7/2013 | Yan et al. | |
| 8,639,618 | B2 | 1/2014 | Yan et al. | |
| 10,692,141 | B2 | 6/2020 | McKenna et al. | |
| 11,210,687 | B2* | 12/2021 | Kesiboyana | G06Q 30/0613 |
| 11,599,939 | B2* | 3/2023 | James | G06Q 40/03 |
| 2011/0173116 | A1* | 7/2011 | Yan | G06Q 10/067 |
| | | | | 705/348 |
| 2019/0258927 | A1* | 8/2019 | Chen | G06N 3/04 |
| 2020/0357052 | A1* | 11/2020 | Hunt | G06Q 20/40 |

FOREIGN PATENT DOCUMENTS

CN           109584048 A       4/2019

* cited by examiner

*Primary Examiner* — Paul S Schwarzenberg
(74) *Attorney, Agent, or Firm* — TROUTMAN PEPPER HAMILTON SANDERS LLP; Christopher J. Forstner; John A. Morrissett (57) ABSTRACT

A system may transmit an MLM to one or more entities. The system may receive, from the one or more entities, data associated with a plurality of customers, the data generated by the MLM. The system may train a federated deep NN based on the data. The system may receive, from a user, a first request for a loan. The system may generate, using the federated deep NN, a risk score associated with the user, wherein the risk score comprises a likelihood the user will satisfy condition(s) of the loan. The system may transmit, to lender(s), the risk score and a second request for loan option(s) for backing the first request for the loan. The system may receive, from the first lender(s), the loan option(s) for backing the first request for the loan, and may transmit the loan option(s) to the user.

20 Claims, 5 Drawing Sheets

SYSTEMS AND METHODS FOR EXCHANGING USER DATA

The disclosed technology relates to systems and methods for exchanging user data, and in particular, for exchanging user data through federated machine learning.

BACKGROUND

Traditional systems and methods for providing loans to customers typically involve siloed approaches. That is, individual lenders typically do not take into account a customer's existing dealings with other lenders, banks, or merchants when deciding whether to issue that customer a new loan. For example, one lender may not be privy to the fact that a customer requesting a loan already has several other loans from various other lenders. Siloed approaches to loan offerings are partially due to certain lenders, such as buy-now-pay-later (BNPL) lenders, not reporting their loan offerings to credit bureaus, or even consistently running credit checks on requesting customers. Further, certain types of loans based on existing credit lines, for example offered by credit card issuers, typically do not require or involve placing credit line holds on customers' credit accounts to ensure customers repay outstanding loans. As such, the current underwriting market is one based on each participating lender's limited view on customers' credit worthiness.

Accordingly, there is a need for improved systems and methods for exchanging user data through a federated machine learning approach. Embodiments of the present disclosure are directed to this and other considerations.

SUMMARY

Disclosed embodiments may include a system for exchanging user data. The system may include one or more processors, and memory in communication with the one or more processors and storing instructions that, when executed by the one or more processors, are configured to cause the system to perform a method for exchanging user data. The system may transmit a first machine learning model (MLM) to one or more entities comprising banks, lenders, merchants, or combinations thereof. The system may receive, from the one or more entities, data associated with a plurality of customers, the data generated by the first MLM and corresponding to existing loans, payment history, late payment behavior, typical installment order size, payment terms, or combinations thereof. The system may iteratively train a federated deep neural network (NN) based on the received data. The system may receive, from a first user via a merchant point-of-sale (POS) terminal, a first request for a first loan, wherein the plurality of customers comprises the first user. The system may generate, using the federated deep NN, a risk score associated with the first user, wherein the risk score comprises a likelihood the first user will satisfy one or more conditions of the first loan, the one or more conditions comprising a payment schedule. The system may transmit, to one or more first lenders, the risk score and a second request for one or more loan options for backing the first request for the first loan, wherein the one or more entities comprise the one or more first lenders. The system may receive, from the one or more first lenders, the one or more loan options for backing the first request for the first loan. The system may transmit the one or more loan options to the merchant POS terminal for display to the first user.

In another embodiment, the system may include one or more processors, and memory in communication with the one or more processors and storing instructions that, when executed by the one or more processors, are configured to cause the system to perform a method for exchanging user data. The system may receive, from a first user via a merchant POS terminal, a first request for a first loan. The system may retrieve, from a centralized database comprising pooled customer data, first data associated with the first user, wherein the pooled customer data is generated by a first MLM and corresponds to existing loans, payment history, late payment behavior, typical installment order size, payment terms, or combinations thereof. The system may train a federated MLM based on the first data. The system may generate, using the federated MLM, a risk score associated with the first user, wherein the risk score comprises a likelihood the first user will satisfy one or more conditions of the first loan. The system may transmit, to one or more lenders, the risk score and a second request for one or more loan options for backing the first request for the first loan. The system may receive, from the one or more lenders, the one or more loan options for backing the first request for the first loan. The system may transmit the one or more loan options to the merchant POS terminal for display to the first user.

In another embodiment, the system may include one or more processors, and memory in communication with the one or more processors and storing instructions that, when executed by the one or more processors, are configured to cause the system to perform a method for exchanging user data. The system may receive, from a first user device associated with a first user, a first request for a first loan. The system may retrieve, from a centralized database comprising pooled customer data, a risk score associated with the first user, wherein the risk score is generated by a federated MLM and comprises a likelihood the first user will satisfy one or more conditions of the first loan. The system may retrieve, from the first user device, device data associated with the first user. The system may generate, using an MLM, an adjusted risk score based on the risk score and the device data. The system may generate, based on the adjusted risk score, one or more loan options for backing the first request for the first loan. The system may cause a graphical user interface (GUI) of the first user device to display the one or more loan options.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate to systems and methods for exchanging user data. In particular, the disclosed technology relates to systems and methods for receiving, from a variety of entities, data associated with a plurality of customers; generating, for a first customer of the plurality of customers, a risk score based on the received data and indicative of the first customer's credit worthiness; transmitting the risk score to one or more lenders; and receiving loan options from the one or more lenders for the first customer based on the first customer's risk score. The systems and methods described herein are necessarily rooted in computer and technology as they utilize MLMs to determine a customer's likely credit worthiness based on a compiled data set, and to generate a risk score based on that determination. In some embodiments, a central server may first choose an initial model to be trained. The central server may then transmit the initial model to a plurality of nodes that each locally train the initial model using each node's individual data. The central server may then pool model results from each of the nodes to generate a compiled global model, or a federated MLM (e.g., a deep NN), for use in determining customers' likely credit worthiness. Machine learning models are a unique computer technology that involves training the models to complete tasks, such as labeling, categorizing, identifying, or determining whether certain aspects of customer transactional or financial patterns, such as existing loans and payment history, indicate a customer's credit worthiness so the MLMs learn how to label, categorize, identify, or determine a customer's likelihood of meeting new loan requirements.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
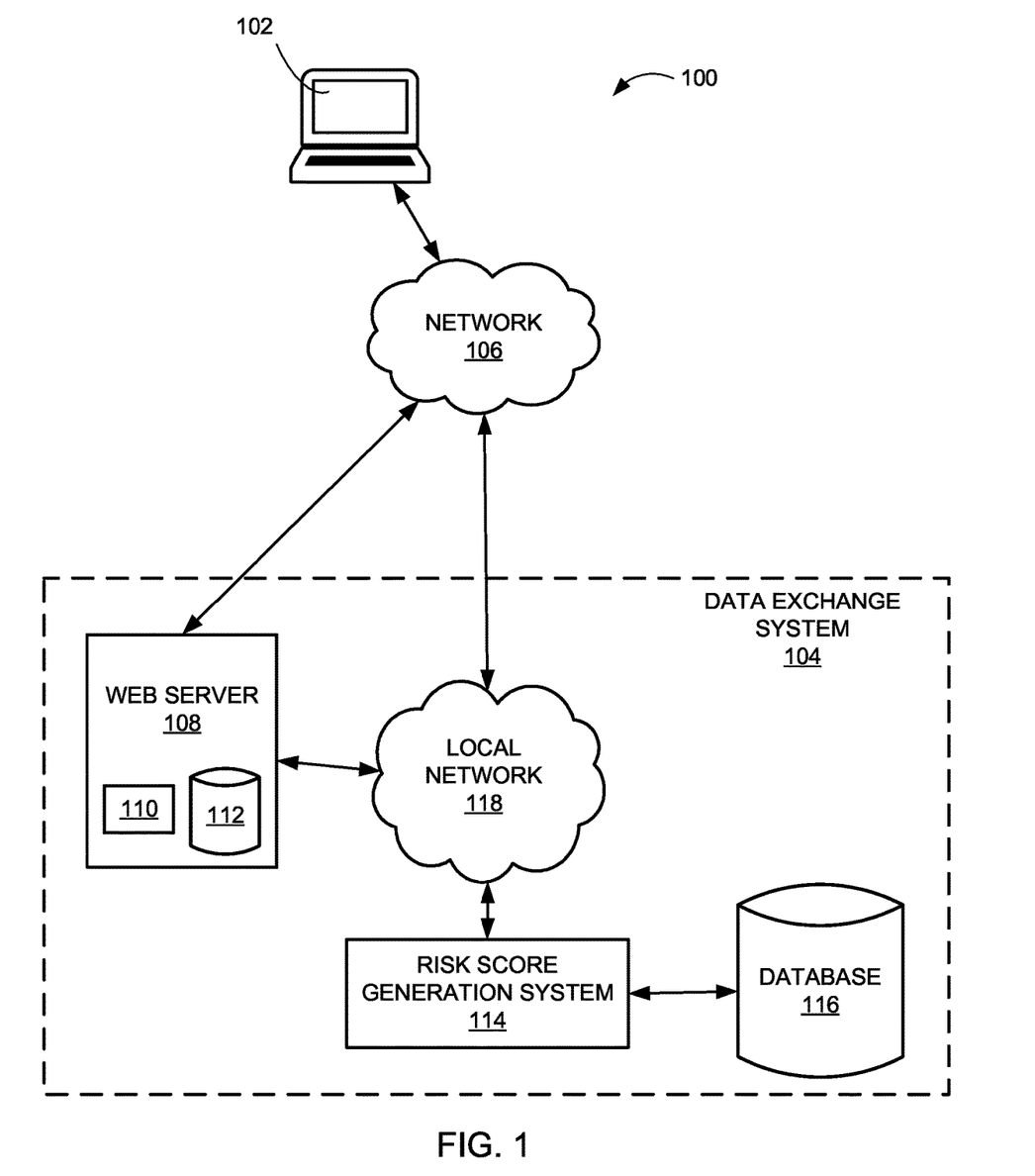
FIG. 1 is a block diagram of an example system that may be used to exchange user data, according to an example implementation of the disclosed technology.

FIG. 1 is a block diagram of an example system that may be used to exchange user data, according to an example implementation of the disclosed technology. The components and arrangements shown in FIG. 1 are not intended to limit the disclosed embodiments as the components used to implement the disclosed processes and features may vary. As shown, a user device 102 may communicate with a data exchange system 104 via a network 106. In certain example implementations, the data exchange system 104 may include a web server 108, a risk score generation system 114, a database 116, and a local network 118.

In some embodiments, a user may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of the data exchange system 104. In some embodiments, the user device 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the data exchange system 104. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

Data exchange system 104 may be associated with and optionally controlled by one or more entities such as a business, corporation, individual, partnership, or any other entity that provides one or more of goods, services, and consultations to individuals such as customers. In some embodiments, data exchange system 104 may be controlled by a third party on behalf of another business, corporation, individual, or partnership. Data exchange system 104 may include one or more servers and computer systems for performing one or more functions associated with products and/or services that the organization provides.

Web server 108 may include a computer system configured to generate and provide one or more websites accessible to customers, as well as any other individuals involved in accessing system 100's normal operations. Web server 108 may include a computer system configured to receive communications from user device 102 via for example, a mobile application, a chat program, an instant messaging program, a voice-to-text program, an SMS message, email, or any other type or format of written or electronic communication. Web server 108 may have one or more processors 110 and one or more web server databases 112, which may be any suitable repository of website data. Information stored in web server 108 may be accessed (e.g., retrieved, updated, and added to) via local network 118 and/or network 106 by one or more devices or systems (e.g., risk score generation system 114) of system 100. In some embodiments, web server 108 may host websites or applications that may be accessed by user device 102. For example, web server 108 may host a financial service provider website that a user device may access by providing an attempted login that is authenticated by risk score generation system 114. According to some embodiments, web server 108 may include software tools, similar to those described with respect to user device 102 above, that may allow web server 108 to obtain network identification data from user device 102.

Local network 118 may include any type of computer networking arrangement used to exchange data in a localized area, such as WiFi, Bluetooth™ Ethernet, and other suitable network connections that enable components of data exchange system 104 to interact with one another and to connect to network 106 for interacting with components in the system 100 environment. In some embodiments, local network 118 may include an interface for communicating with or linking to network 106. In other embodiments, certain components of data exchange system 104 may communicate via network 106, without a separate local network 118.

In accordance with certain example implementations of the disclosed technology, data exchange system 104 may include one or more computer systems configured to compile data from a plurality of sources, for example, risk score generation system 114, web server 108, and/or database 116. Risk score generation system 114 may correlate compiled data, analyze the compiled data, arrange the compiled data, generate derived data based on the compiled data, and store the compiled and derived data in a database such as database 116. According to some embodiments, database 116 may be a database associated with an organization and/or a related entity that stores a variety of information relating to customers, transactions, trainings, and business operations. Database 116 may also serve as a back-up storage device and may contain data and information that is also stored on, for example, database 250, as discussed below with reference to FIG. 2.

Although the preceding description describes various functions of a web server 108, a risk score generation system 114, and a database 116, in some embodiments, some or all of these functions may be carried out by a single computing device or a plurality of computing devices in a (cloud) serverless system.

Figure 2:
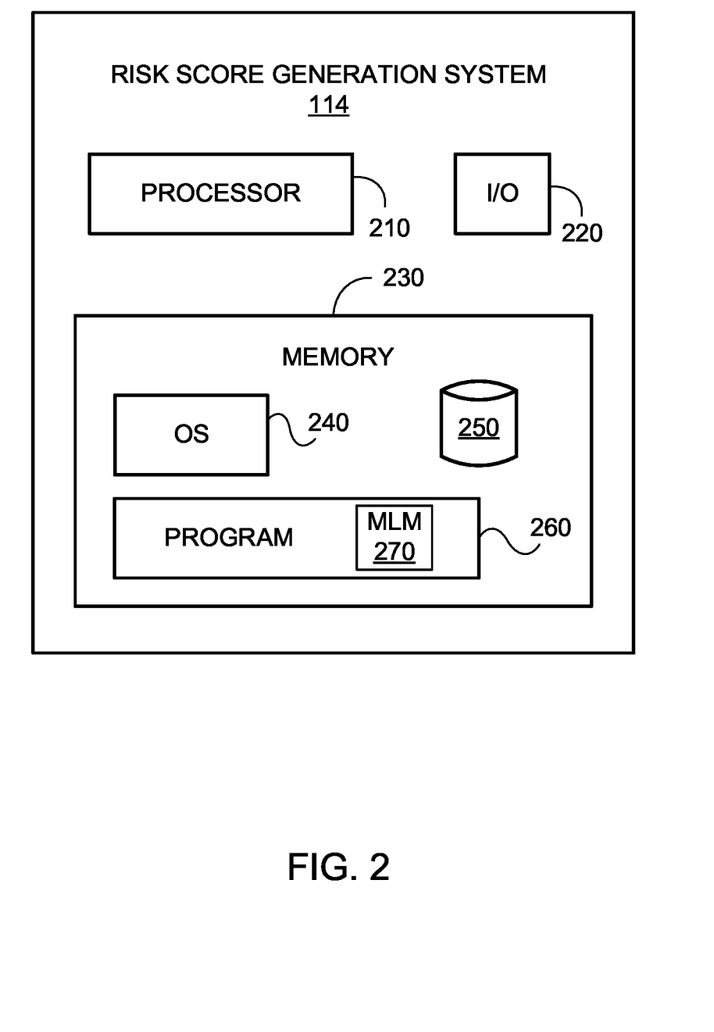
FIG. 2 is a block diagram of an example risk score generation system used to determine a likelihood a user will satisfy one or more conditions of a loan, according to an example implementation of the disclosed technology.

An example embodiment of risk score generation system 114 is shown in more detail in FIG. 2. According to some embodiments, user device 102 and web server 108, as depicted in FIG. 1 and described above, may have a similar structure and components that are similar to those described with respect to risk score generation system 114 shown in FIG. 2. As shown, risk score generation system 114 may include a processor 210, an input/output ("I/O") device 220, a memory 230 containing an operating system ("OS") 240, a database 250, and a program 260. In some embodiments, program 260 may include an MLM 270 that may be trained, for example, to generate customer risk scores based on pooled entity data, as further discussed below. In certain implementations, MLM 270 may issue commands in response to processing an event, in accordance with a model that may be continuously or intermittently updated. Moreover, processor 210 may execute one or more programs (such as via a rules-based platform or the trained MLM 270), that, when executed, perform functions related to disclosed embodiments.

In certain example implementations, risk score generation system 114 may be a single server or may be configured as a distributed computer system including multiple servers or computers that interoperate to perform one or more of the processes and functionalities associated with the disclosed embodiments. In some embodiments, risk score generation system 114 may be one or more servers from a serverless or scaling server system. In some embodiments, risk score generation system 114 may further include a peripheral interface, a transceiver, a mobile network interface in communication with processor 210, a bus configured to facilitate communication between the various components of risk score generation system 114, and a power source configured to power one or more components of risk score generation system 114.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a USB port, a micro-USB port, a high-definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, BLE, WiFi™, ZigBee™, ABC protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 230.

Processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. Processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, processor 210 may be a single core processor that is configured with virtual processing technologies. In certain embodiments, processor 210 may use logical processors to simultaneously execute and control multiple processes. Processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, risk score generation system 114 may include one or more storage devices configured to store information used by processor 210 (or other components) to perform certain functions related to the disclosed embodiments. In one example, risk score generation system 114 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, risk score generation system 114 may include a memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, risk score generation system 114 may include memory 230 that may include one or more programs 260 to perform one or more functions of the disclosed embodiments. For example, in some embodiments, risk score generation system 114 may additionally manage dialogue and/or other interactions with the customer via a program 260.

Processor 210 may execute one or more programs located remotely from risk score generation system 114. For example, risk score generation system 114 may access one or more remote programs that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include database 250 for storing related data to enable risk score generation system 114 to perform one or more of the processes and functionalities associated with the disclosed embodiments.

Risk score generation system 114 may also be communicatively connected to one or more memory devices (e.g., databases) locally or through a network. The remote memory devices may be configured to store information and may be accessed and/or managed by risk score generation system 114. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Risk score generation system 114 may also include one or more I/O devices 220 that may comprise one or more interfaces for receiving signals or input from devices and providing signals or output to one or more devices that allow data to be received and/or transmitted by risk score generation system 114. For example, risk score generation system 114 may include interface components, which may provide interfaces to one or more input devices, such as one or more keyboards, mouse devices, touch screens, track pads, trackballs, scroll wheels, digital cameras, microphones, sensors, and the like, that enable risk score generation system 114 to receive data from a user (such as, for example, via user device 102).

In example embodiments of the disclosed technology, risk score generation system 114 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While risk score generation system 114 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of risk score generation system 114 may include a greater or lesser number of components than those illustrated.

Figure 3:
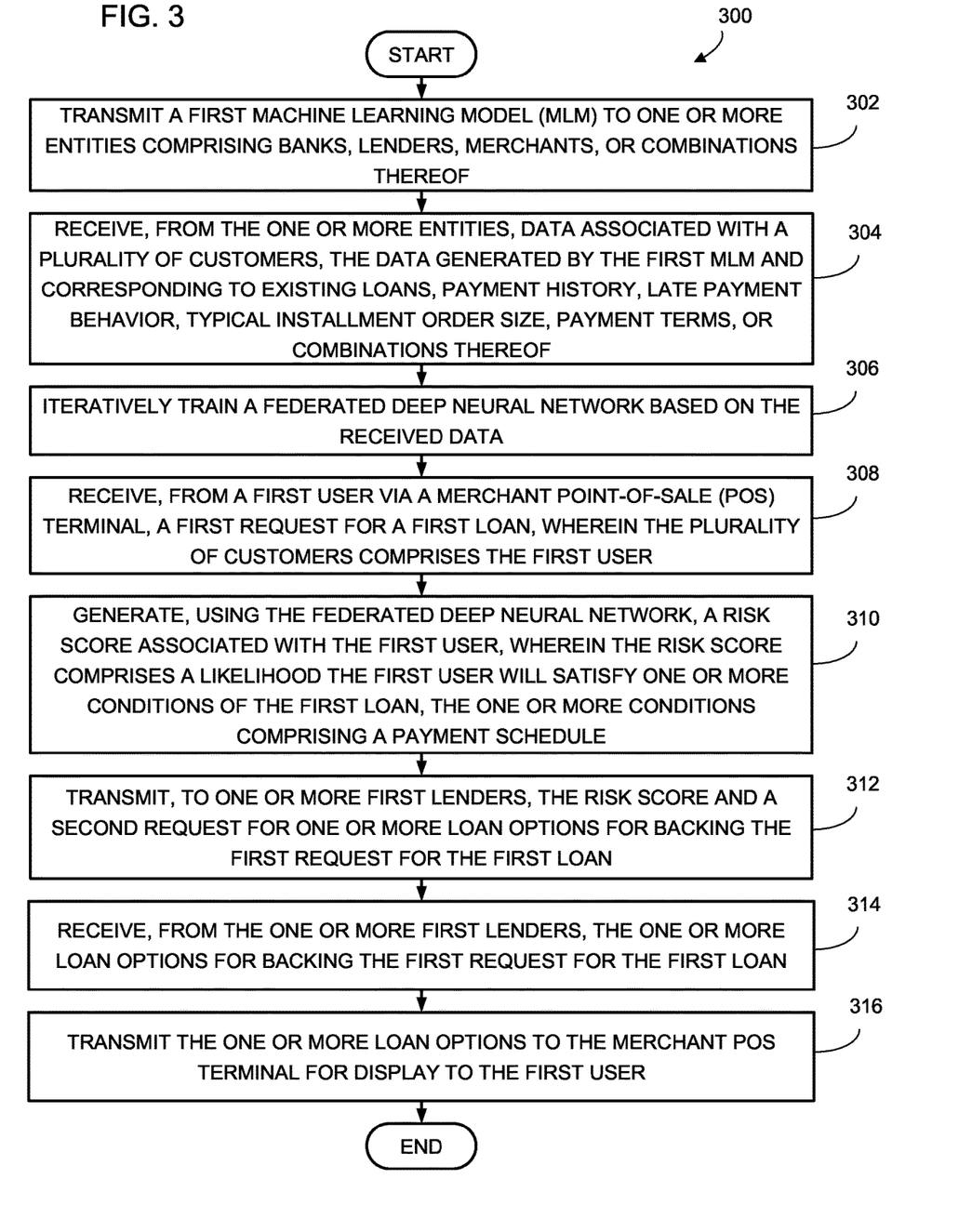
FIG. 3 is a flow diagram illustrating an exemplary method for exchanging user data, in accordance with certain embodiments of the disclosed technology.

FIG. 3 provides a flow diagram illustrating an exemplary method 300 for exchanging user data, in accordance with certain embodiments of the disclosed technology. Method 300 may be performed by one or more components of system 100 (e.g., web server 108 or risk score generation system 114 of data exchange system 104, or user device 102), as described above with respect to FIGS. 1 and 2.

In block 302 of FIG. 3, the system (e.g., via data exchange system 104) may transmit a first MLM to one or more entities comprising banks, lenders, merchants, or combinations thereof. That is, the system may select an MLM to eventually transmit to one or more entities such that each individual entity may locally train the MLM using its own entity-specific customer data. The model may first be trained, however, until it reaches a certain accuracy level before being transmitted to the one or more entities. The model may be initially trained by defining variables potentially relevant to customers' ability to pay back loans, such as payments history, purchased product category, demographics, income, credit score, and the like. The model may then look to historical performance of certain loans in comparison to these variables to determine the importance of each variable. The model may then rank certain loans, e.g., on a scale of 1-10, with respect to a likelihood they may go delinquent if offered to customers.

A benefit of this feature is that each entity may eventually transmit results of its individually trained model back to the system rather than transmit customer data itself, as further discussed below. This provides for a federated system wherein customer data may remain private yet the system may use entity model results to revise a global or centralized model, as further discussed below.

In block 304 of FIG. 3, the system (e.g., via data exchange system 104) may receive, from the one or more entities, data associated with a plurality of customers, the data generated by the first MLM and corresponding to existing loans, payment history, late payment behavior, typical installment order size, payment terms, or combinations thereof. That is, as discussed above, rather than each entity share customer data directly with the system, each entity may train the initial, system provided MLM with the entity's own customer data. The system may then receive model results from each entity and use the compiled results to generate a new global model for use in determining customers' likely credit worthiness, as further discussed below.

Each entity type may be able to share unique information associated with its customers. For example, a bank may be able to provide information associated with typical customer behavior with respect to paying off a credit card, frequency at which a customer receives a paycheck, and the like. As another example, a lender may be able to provide information associated with what, if any, loans a customer currently has outstanding, whether the customer has historically paid off loans on time, and the like.

In block 306, the system (e.g., via data exchange system 104) may iteratively train a federated deep NN based on the received data. That is, the system may be configured to iteratively update a global or federated model each time the system receives model results data from one or more entities, as described above.

In block 308, the system (e.g., via data exchange system 104) may receive, from a first user via a merchant POS terminal, a first request for a first loan, wherein the plurality of customers comprises the first user. In some embodiments, a user may initiate a transaction at a merchant POS terminal, during which the user may select an option to request financing for the product or service being purchased. For example, a user may wish to pay for the transaction through a BNPL loan, requiring the user pay back the loan in certain installments over a certain time period. The user may, for example via a GUI of the merchant POS terminal display, select an option for requesting this loan. In some embodiments, the system may receive the first request for the first loan via a user device (e.g., user device 102). For example, the first user may initiate the first request while conducting an online transaction, or a transaction via a mobile application.

In some embodiments, the system may receive the first request from the first user with the intention of using the first loan to support a future transaction. The first user may be one customer of the plurality of customers whose data was previously received by the system, as discussed above with respect to block 302.

In some embodiments, as part of the system receiving the first request for the first loan, the system may request, e.g., via a GUI, a user input one or more types of information, such as a minimal first payment or a length of a BNPL loan the user desires to obtain. The system may then utilize this inputted information to search for potential lenders that may offer the best loan options for this particular customer.

In some embodiments, the system may be configured to prompt the user, e.g., via a GUI, for additional information (e.g., how many BNPL loans or the highest BNPL loan the user currently has) depending on a determined likelihood of customer risk, as further discussed below. Upon receiving the additional information, the system may dynamically update and display, e.g., via a GUI, different loan options than were initially provided to the user. This dynamic update may occur in real-time or take place over a longer period of time. For example, the system may require additional time to match loan options with the user's inputted additional information. In such case, the system may, e.g., via a GUI, ask if a user is willing to wait a certain amount of time (e.g., hours or days) for updated loan options while the additional information is being reviewed. A user may then have the option to pay full price for the product or service-at-issue, e.g., using a standard credit card, with the option to change to a BNPL method of payment once the additional information is reviewed and updated loan options identified. If the user accepts this option, the system may be configured to notify the user (e.g., via email, push notification to a user device, etc.) when updated loan options are available for selection.

In block 310, the system (e.g., via risk score generation system 114) may generate, using the federated deep NN, a risk score associated with the first user, wherein the risk score comprises a likelihood the first user will satisfy one or more conditions of the first loan. In some embodiments, the risk score may be in the form of an index score (e.g., on a 1-10 scale). The system may use the federated deep NN, along with the entity-provided model results, as discussed above, to determine whether certain aspects of customers' financial portfolios (e.g., number of existing loans, historical trends in paying off loans and other accounts, etc.) more likely indicate customers' likelihood of meeting new loan conditions or requirements.

As discussed above, an advantage of the present technology is that it allows for a federated approach, rather than limited or siloed, to the underwriting market, wherein lenders are able to learn more about customers' credit worthiness based on customer data received from a variety of entities with whom customers previously or currently transact. The federated model, taking all data into account, is trained to generate global risk scores for customers, indicating their credit worthiness and the likelihood they will satisfy conditions (e.g., payment schedules) of newly offered loans. The system, however, does not require the sharing of one lender's supplied customer data with another lender. That is, to ensure any sensitive customer data is not passed from lender to lender, or entity to entity, the system may be configured to pass along only a customer's global risk score to potential new lenders, such that a given lender may adjust its own internal risk score and/or decide whether it might offer that customer a new loan, as further discussed below.

In block 312, the system (via data exchange system 104) may transmit, to one or more first lenders, the risk score and a second request for one or more loan options for backing the first request for the first loan. As discussed above, the system may transmit the generated risk score associated with the first user such that one or more lenders may decide whether to offer the first user a loan to financially back the first user's in-process transaction. In some embodiments, the system may be owned and/or operated by a specific lender such that the generated risk score need not be transmitted to any other lenders, but simply used internally by the specific lender for it to decide whether to offer certain loan options to the first user.

In block 314, the system (e.g., via data exchange system 104) may receive, from the one or more first lenders, the one or more loan options for backing the first request for the first loan. Each of the one or more loan options may comprise one or more conditions, as discussed above, such as a payment schedule, a number of required installments, any applicable late fees, and the like.

In block 316, the system (e.g., via data exchange system 104) may transmit the one or more loan options to the merchant POS terminal for display to the first user. That is, the system may transmit the received one or more loan options to the merchant POS terminal to enable the first user to look through the options and their associated conditions. The loan options may be displayed via a GUI of the POS terminal display, such that the user may interact with the display, for example by clicking on a button to view and/or select each loan option, or by selecting a loan option from a dropdown menu selector.

Figure 4:
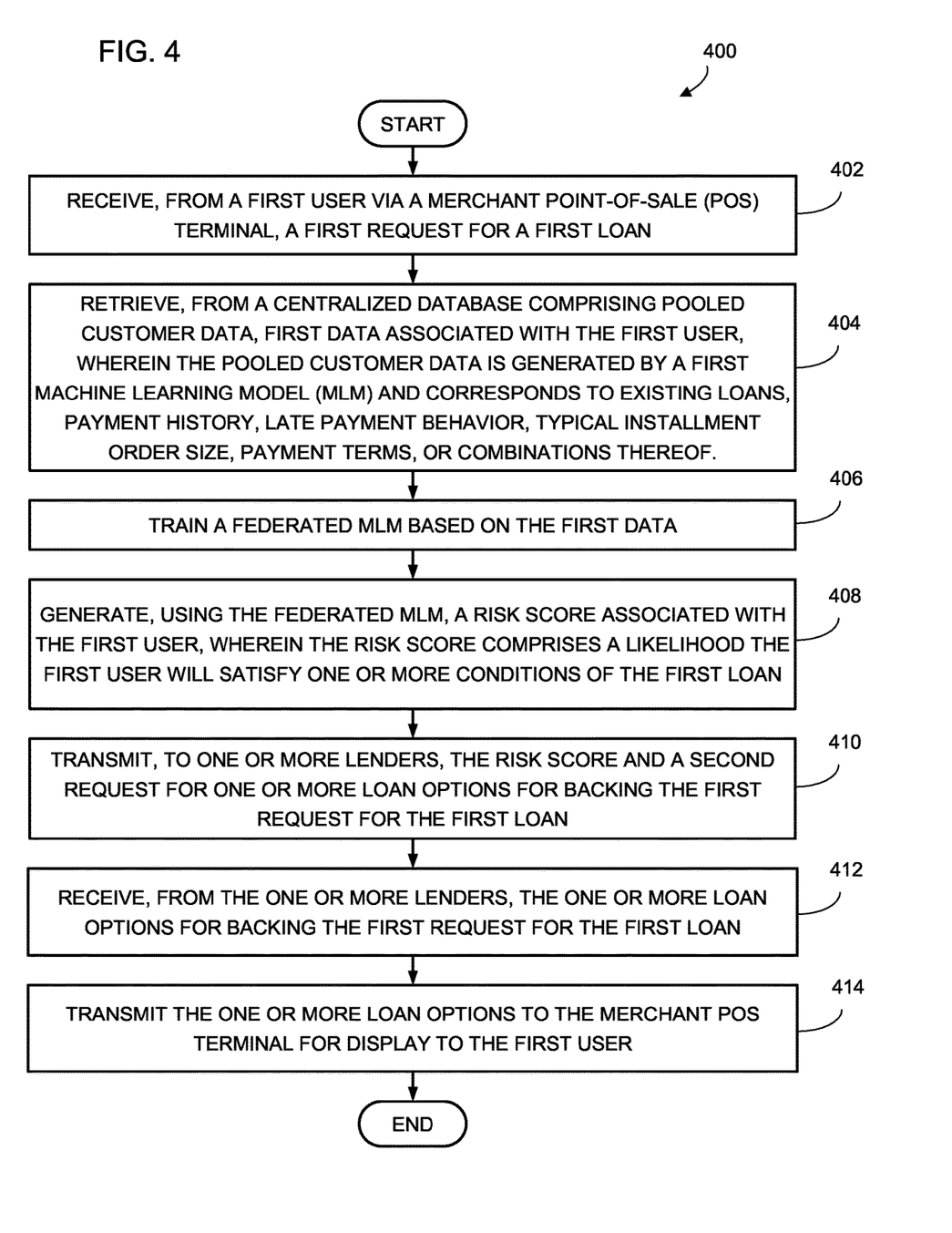
FIG. 4 is a flow diagram illustrating an exemplary method for exchanging user data, in accordance with certain embodiments of the disclosed technology.

Method 400 of FIG. 4 is similar to method 300 of FIG. 3, except that method 400 begins with receiving a user's loan request, and includes retrieving user data from an already-compiled centralized system. The descriptions of blocks 402, 408, 410, 412, and 414 may be the same as or similar to the respective descriptions of blocks 308, 310, 312, 314, and 316 of method 300 and as such, are not repeated herein for brevity.

In block 404, the system (e.g., via data exchange system 104) may retrieve, from a centralized database comprising pooled customer data, first data associated with the first user, wherein the pooled customer data is generated by a first MLM and corresponds to existing loans, payment history, late payment behavior, typical installment order size, payment terms, or combinations thereof. That is, as discussed above, the system may have previously transmitted an MLM to one or more entities such that each entity could train the MLM using its own entity-specific customer information. Each entity may then have transmitted model results to the system such that the system could maintain the model results in a centralized location and use them to iteratively train a global or federated MLM.

In block 406, the system (e.g., via data exchange system 104) may train a federated MLM based on the first data. That is, as discussed above, the system may use the entity-specific model results transmitted by each individual entity to train a global or federated MLM (e.g., a deep NN).

Figure 5:
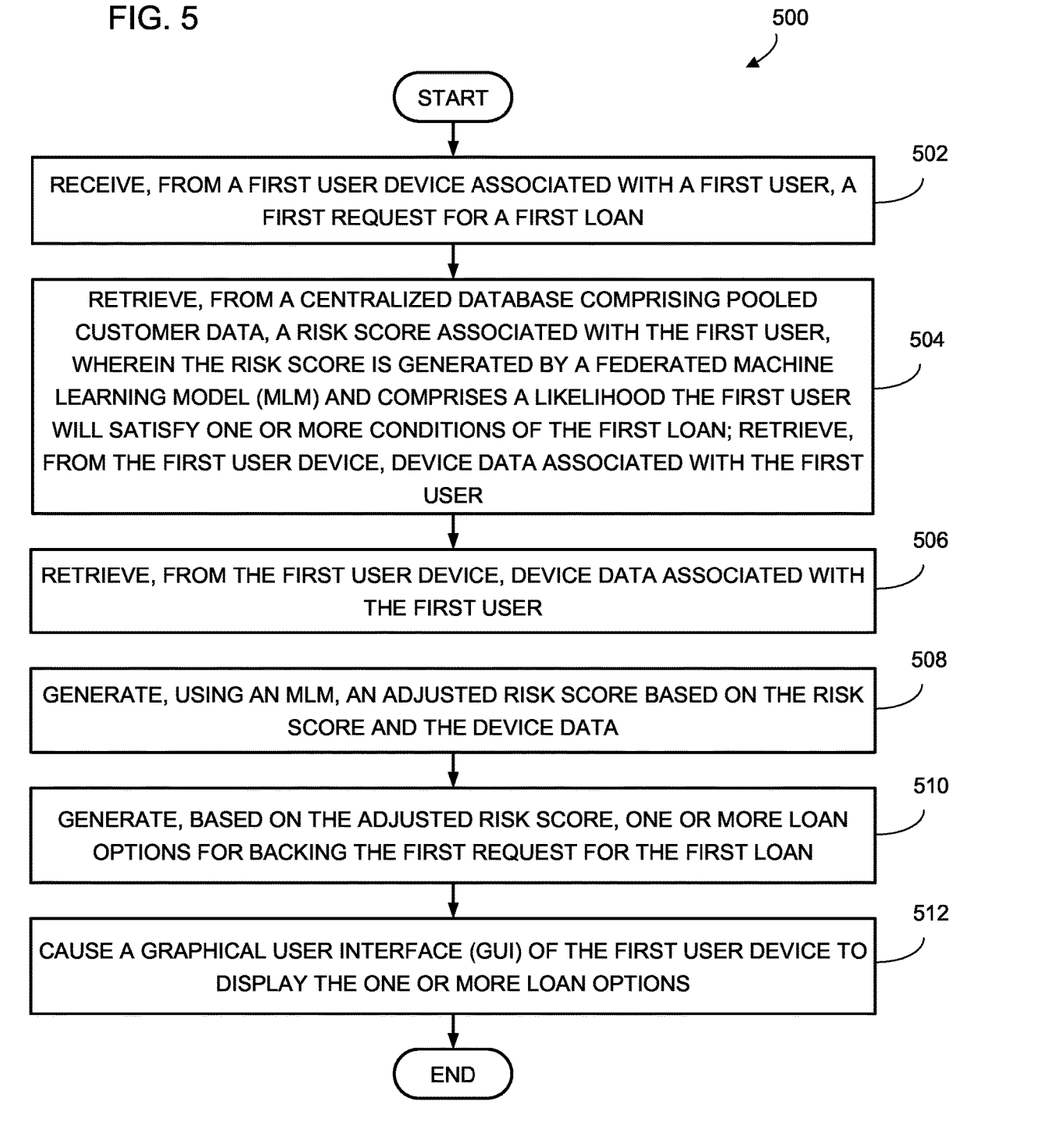
FIG. 5 is a flow diagram illustrating an exemplary method for exchanging user data, in accordance with certain embodiments of the disclosed technology.

Method 500 of FIG. 5 is also similar to method 300 of FIG. 3, except that method 500 covers adjusting the global risk score based on user device data. While each of these descriptions is provided from the perspective of one or more components of system 100 (e.g., data exchange system 104, risk score generation system 114, etc.), it should be noted that one or more of the blocks of method 500 may be performed by a separate system (e.g., a banking system of a financial institution).

In block 502, the system (e.g., via data exchange system 104) may receive, from a first user device (e.g., user device 102) associated with a first user, a first request for a first loan. That is, as discussed above, a user may approach a specific lender for purposes of obtaining a loan to support either a current or future transaction.

In block 504, (e.g., via data exchange system 104) retrieve, from a centralized database comprising pooled customer data, a risk score associated with the first user, wherein the risk score is generated by a federated MLM and comprises a likelihood the first user will satisfy one or more conditions of the first loan. That is, as discussed above, a centralized system may have previously received customer data—in the form of entity-specific model results—from one or more entities. The system may have compiled the received data in a centralized location such that the system could train a federated MLM for generating risk scores for individual customers. As such, in block 504, the system may be configured to retrieve a unique risk score associated with the first user.

In block 506, the system (e.g., via data exchange system 104) may retrieve, from the first user device, device data associated with the first user. In some embodiments, the first user may have previously enrolled in a program owned and/or operated by an organization (e.g., a financial organization) such that the organization may retrieve certain types of data directly from the user's personal device (e.g., a smartphone). For example, the first user may have previously given the organization permission (e.g., via a user profile or account settings) to retrieve the first user's browsing history, payment history, loan application history, etc., directly from the first user's device, such as through a mobile application. Providing data retrieval permissions to the organization may come along with one or more incentives to the first user, such as reward points, offers, credits, and the like.

In some embodiments, one or more entities may use retrieved device data to update internal models, and subsequently provide updated model results to a central system, as discussed above with respect to block 304. As also discussed above in block 310 with respect to customer data, the retrieved device data may also be kept private from other entities, and only used for purposes of generating customer risk scores. For example, the system may be configured to tokenize the device data prior to sending it to the centralized database to ensure any sensitive information contained in the retrieved device data is maintained as private.

In block 508, the system (e.g., via risk score generation system 114) may generate, using an MLM, an adjusted risk score based on the risk score and the device data. That is, an MLM used internally by an entity may be trained to combine the retrieved device data with other customer data to adjust the initial global risk score retrieved from the central system. This feature provides the added benefit of increasing the likelihood that a user would satisfy any conditions of a new loan, as the adjusted risk score is generated based on a larger data set corresponding to the user's past and current transactional and financial behaviors and trends.

In block 510, the system (e.g., via data exchange system 104) may generate, based on the adjusted risk score, one or more loan options for backing the first request for the first loan. This step may be similar to that described with respect to block 314 of method 300, only block 510 provides a perspective from a single lender who, upon receiving the loan request from the first user and generating the user's adjusted risk score, determines one or more loan options, along with respective conditions, that the single lender is willing to provide to the first user.

In block 512, the system (e.g., via data exchange system 104) may cause a GUI of the first user device to display the one or more loan options. The loan options may be displayed via a GUI such that the user may interact with the display, for example by clicking on a button to view and/or select each loan option, or by selecting a loan option from a dropdown menu selector.

Example Use Case

The following example use case describes an example of a typical user flow pattern. This section is intended solely for explanatory purposes and not in limitation.

In one example, an organization (e.g., a financial organization) may oversee a pooled data exchange into which a variety of entities can submit customer information, such as that corresponding to existing loans, payment history, credit information, etc. The purpose of such data exchange is such that each of the involved entities may receive a more exhaustive financial portfolio for a given customer than each entity would on its own be able to access. The organization may first select and train an MLM to transmit to one or more entities. Each entity may then locally train the MLM using the entity's private customer data. Each entity may then transmit local model results back to the organization such that the organization may compile all entity model results and use them for training a federated MLM, such as a deep NN.

A customer may then enter a merchant premises for purposes of purchasing a product. When the customer begins the checkout process via the merchant POS terminal, the customer may wish to finance the purchase of the product using a BNPL loan. There may be a button on the checkout screen that enables the customer to select a BNPL option. Upon making that selection, the organization may receive notification of the customer's request for the BNPL loan, and may determine the customer is one of the customers whose information was previously provided to the pooled data exchange by one or more entities. The organization may utilize the federated MLM to generate a risk score for the customer based on the data associated with the customer from within the pooled data exchange. The federated MLM may generate a score on a scale of 1-10 indicating the likelihood that the customer will be able to pay back a BNPL loan for the given purchase. The organization may then transmit the generated risk score to one or more lenders such that each lender may decide if they want to offer the customer a loan, and if so, what conditions may come with the loan (e.g., number of payment installments). The organization may then receive one or more loan options from the one or more lenders, and may transmit the loan options to the merchant POS terminal for display to the customer via a GUI. The customer may be able to select a button displayed proximate each respective loan option such that the customer may review the respective conditions of each loan option and make a final selection of which loan option to use for completing the purchase.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: transmit a first machine learning model (MLM) to one or more entities comprising banks, lenders, merchants, or combinations thereof; receive, from the one or more entities, data associated with a plurality of customers, the data generated by the first MLM and corresponding to existing loans, payment history, late payment behavior, typical installment order size, payment terms, or combinations thereof; iteratively train a federated deep neural network based on the received data; receive, from a first user via a merchant point-of-sale (POS) terminal, a first request for a first loan, wherein the plurality of customers comprises the first user; generate, using the federated deep neural network, a risk score associated with the first user, wherein the risk score comprises a likelihood the first user will satisfy one or more conditions of the first loan, the one or more conditions comprising a payment schedule; transmit, to one or more first lenders, the risk score and a second request for one or more loan options for backing the first request for the first loan, wherein the one or more entities comprise the one or more first lenders; receive, from the one or more first lenders, the one or more loan options for backing the first request for the first loan; and transmit the one or more loan options to the merchant POS terminal for display to the first user.

Clause 2: The system of clause 1, wherein the data further comprises device data associated with the plurality of customers.

Clause 3: The system of clause 2, wherein the device data comprises at least browsing history.

Clause 4: The system of clause 2, wherein the instructions are further configured to cause the system to: tokenize the data and the device data to shield potentially sensitive information.

Clause 5: The system of clause 1, wherein the instructions are further configured to cause the system to: receive, from the first user via the merchant POS terminal, a first selection of a first loan option of the one or more loan options; and dynamically update the federated deep neural network based on the first selection.

Clause 6: A system comprising: one or more processors; and a memory in communication with the one or more processors and storing instructions that, when executed by the one or more processors, are configured to cause the system to: receive, from a first user via a merchant point-of-sale (POS) terminal, a first request for a first loan; retrieve, from a centralized database comprising pooled customer data, first data associated with the first user, wherein the pooled customer data is generated by a first machine learning model (MLM) and corresponds to existing loans, payment history, late payment behavior, typical installment order size, payment terms, or combinations thereof; train a federated MLM based on the first data; generate, using the federated MLM, a risk score associated with the first user, wherein the risk score comprises a likelihood the first user will satisfy one or more conditions of the first loan; transmit, to one or more lenders, the risk score and a second request for one or more loan options for backing the first request for the first loan; receive, from the one or more lenders, the one or more loan options for backing the first request for the first loan; and transmit the one or more loan options to the merchant POS terminal for display to the first user.

Clause 7: The system of clause 6, wherein the pooled customer data further comprises device data.

Clause 8: The system of clause 7, wherein the device data comprises at least browsing history.

Clause 9: The system of clause 7, wherein the pooled customer data is tokenized to shield potentially sensitive information.

Clause 10: The system of clause 6, wherein the pooled customer data is associated with one or more types of entities.

Clause 11: The system of clause 10, wherein the one or more types of entities comprise banks, lenders, merchants, or combinations thereof.

Clause 12: The system of clause 6, wherein the one or more conditions comprise a payment schedule.

Clause 13: The system of clause 6, wherein the instructions are further configured to cause the system to: receive, from the first user via the merchant POS terminal, a first selection of a first loan option of the one or more loan options; and dynamically update the federated MLM based on the first selection, wherein the federated MLM comprises a federated deep neural network.

Clause 14: A system comprising: one or more processors; and a memory in communication with the one or more processors and storing instructions that, when executed by the one or more processors, are configured to cause the system to: receive, from a first user device associated with a first user, a first request for a first loan; retrieve, from a centralized database comprising pooled customer data, a risk score associated with the first user, wherein the risk score is generated by a federated machine learning model (MLM) and comprises a likelihood the first user will satisfy one or more conditions of the first loan; retrieve, from the first user device, device data associated with the first user; generate, using an MLM, an adjusted risk score based on the risk score and the device data; generate, based on the adjusted risk score, one or more loan options for backing the first request for the first loan; and cause a graphical user interface (GUI) of the first user device to display the one or more loan options.

Clause 15: The system of clause 14, wherein the pooled customer data corresponds to existing loans, payment history, late payment behavior, typical installment order size, payment terms, or combinations thereof.

Clause 16: The system of clause 14, wherein the pooled customer data is associated with one or more types of entities.

Clause 17: The system of clause 16, wherein the one or more types of entities comprise banks, lenders, merchants, or combinations thereof.

Clause 18: The system of clause 14, wherein the device data comprises at least browsing history.

Clause 19: The system of clause 14, wherein the instructions are further configured to cause the system to: receive, from the first user device, one or more permissions corresponding to one or more types of device data that may be retrieved from the first user device, wherein retrieving the device data associated with the first user is based on the one or more permissions.

Clause 20: The system of clause 14, wherein the instructions are further configured to cause the system to: receive, from the first user device, a first selection of a first loan option of the one or more loan options; and dynamically update the MLM based on the first selection.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware.

For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:
   transmit a first machine learning model (MLM) to one or more entities comprising banks, lenders, merchants, or combinations thereof;
   receive, from the one or more entities, data associated with a plurality of customers, the data comprising model results generated by each of the one or more entities by locally training the first MLM using its respective own entity-specific customer data and corresponding to existing loans, payment history, late payment behavior, typical installment order size, payment terms, or combinations thereof;
   iteratively train a federated deep neural network based on the received data;
   receive, from a first user via a merchant point-of-sale (POS) terminal, a first request for a first loan, wherein the plurality of customers comprises the first user;
   generate, using the federated deep neural network, a risk score associated with the first user, wherein the risk score comprises a likelihood the first user will satisfy one or more conditions of the first loan, the one or more conditions comprising a payment schedule;
   transmit, to one or more first lenders, the risk score and a second request for one or more loan options for backing the first request for the first loan, wherein the one or more entities comprise the one or more first lenders;
   receive, from the one or more first lenders, the one or more loan options for backing the first request for the first loan; and
   transmit the one or more loan options to the merchant POS terminal for display to the first user.

2. The system of claim 1, wherein the data further comprises device data associated with the plurality of customers.

3. The system of claim 2, wherein the device data comprises at least browsing history.

4. The system of claim 2, wherein the instructions are further configured to cause the system to:
   tokenize the data and the device data to shield potentially sensitive information.

5. The system of claim 1, wherein the instructions are further configured to cause the system to:
   receive, from the first user via the merchant POS terminal, a first selection of a first loan option of the one or more loan options; and
   dynamically update the federated deep neural network based on the first selection.

6. A system comprising:
   one or more processors; and
   a memory in communication with the one or more processors and storing instructions that, when executed by the one or more processors, are configured to cause the system to:
   transmit a first machine learning model (MLM) to one or more entities;
   receive, from the one or more entities, pooled customer data associated with a plurality of customers;
   receive, from a first user via a merchant point-of-sale (POS) terminal, a first request for a first loan;
   retrieve, from a centralized database comprising the pooled customer data, first data associated with the first user, wherein the pooled customer data is generated by each of the one or more entities locally training the first MLM using its own entity-specific customer data to generate model results and corresponds to existing loans, payment history, late payment behavior, typical installment order size, payment terms, or combinations thereof;
   train a federated MLM based on the first data;
   generate, using the federated MLM, a risk score associated with the first user, wherein the risk score comprises a likelihood the first user will satisfy one or more conditions of the first loan;
   transmit, to one or more lenders, the risk score and a second request for one or more loan options for backing the first request for the first loan;
   receive, from the one or more lenders, the one or more loan options for backing the first request for the first loan; and
   transmit the one or more loan options to the merchant POS terminal for display to the first user.

7. The system of claim 6, wherein the pooled customer data further comprises device data.

8. The system of claim 7, wherein the device data comprises at least browsing history.

9. The system of claim 7, wherein the pooled customer data is tokenized to shield potentially sensitive information.

10. The system of claim 6, wherein the pooled customer data is associated with one or more types of entities.

11. The system of claim 10, wherein the one or more types of entities comprise banks, lenders, merchants, or combinations thereof.

12. The system of claim 6, wherein the one or more conditions comprise a payment schedule.

13. The system of claim 6, wherein the instructions are further configured to cause the system to:
   receive, from the first user via the merchant POS terminal, a first selection of a first loan option of the one or more loan options; and
   dynamically update the federated MLM based on the first selection,
   wherein the federated MLM comprises a federated deep neural network.

14. A system comprising:
   one or more processors; and
   a memory in communication with the one or more processors and storing instructions that, when executed by the one or more processors, are configured to cause the system to:
   transmit a first machine learning model (MLM) to one or more entities;
   receive, from the one or more entities, pooled customer data associated with a plurality of customers;
   receive, from a first user device associated with a first user, a first request for a first loan;
   retrieve, from a centralized database comprising the pooled customer data, a risk score associated with the first user, wherein the risk score is generated by a federated MLM and comprises a likelihood the first user will satisfy one or more conditions of the first loan and the pooled customer data comprises model results generated by the one or more entities locally training the first MLM using its own entity-specific customer data to generate the model results;

retrieve, from the first user device, device data associated with the first user;

generate, using a second MLM, an adjusted risk score based on the risk score and the device data;

generate, based on the adjusted risk score, one or more loan options for backing the first request for the first loan; and cause a graphical user interface (GUI) of the first user device to display the one or more loan options.

15. The system of claim 14, wherein the pooled customer data corresponds to existing loans, payment history, late payment behavior, typical installment order size, payment terms, or combinations thereof.

16. The system of claim 14, wherein the pooled customer data is associated with one or more types of entities.

17. The system of claim 16, wherein the one or more types of entities comprise banks, lenders, merchants, or combinations thereof.

18. The system of claim 14, wherein the device data comprises at least browsing history.

19. The system of claim 14, wherein the instructions are further configured to cause the system to:

receive, from the first user device, one or more permissions corresponding to one or more types of device data that may be retrieved from the first user device, wherein retrieving the device data associated with the first user is based on the one or more permissions.

20. The system of claim 14, wherein the instructions are further configured to cause the system to:

receive, from the first user device, a first selection of a first loan option of the one or more loan options; and dynamically update the second MLM based on the first selection.

* * * * *